No. 782,292. PATENTED FEB. 14, 1905.
W. & F. WALTER.
VEGETABLE OR FRUIT SLICER.
APPLICATION FILED MAY 20, 1904.
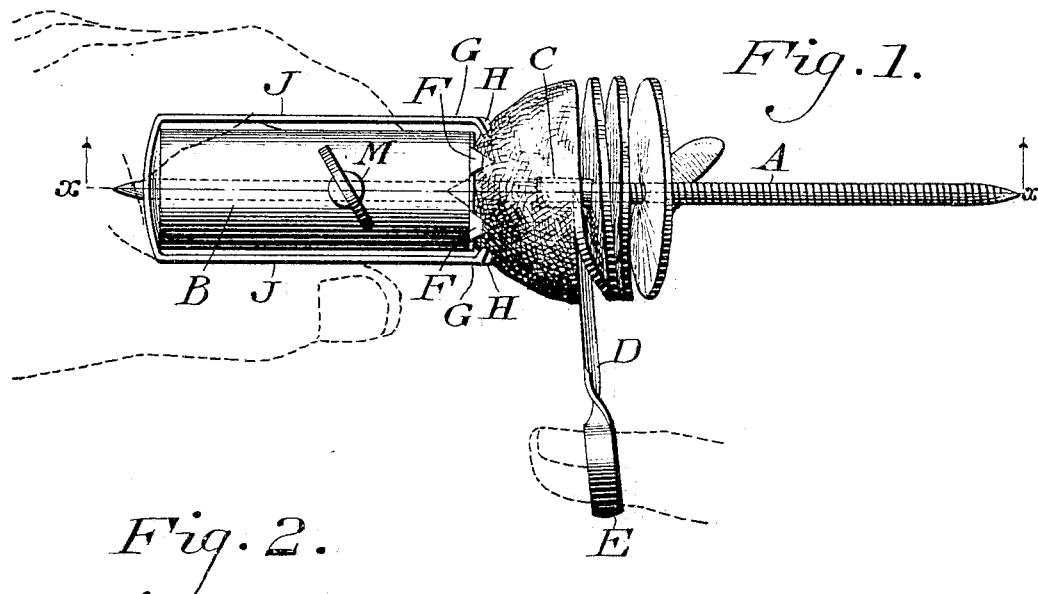
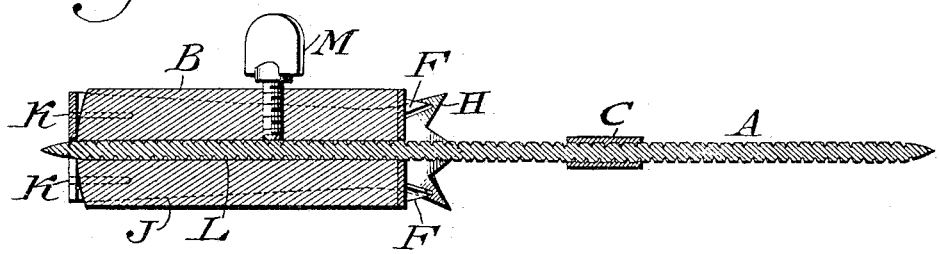
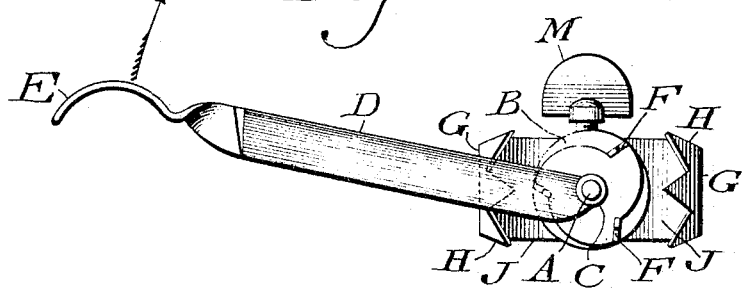
Witnesses
P. F. Nagle.
L. Douville.
Inventors
Waldemar Walter.
Frank Walter.
By Wiedersheim & Fairbanks
Attorneys No. 782,292. Patented February 14, 1905.

UNITED STATES PATENT OFFICE.

WALDEMAR WALTER AND FRANK WALTER, OF PHILADELPHIA, PENNSYLVANIA.

VEGETABLE OR FRUIT SLICER.

SPECIFICATION forming part of Letters Patent No. 782,292, dated February 14, 1905.

Application filed May 20, 1904. Serial No. 208,827.

*To all whom it may concern:*

Be it known that we, WALDEMAR WALTER and FRANK WALTER, citizens of the United States, residing in the city and county of Philadelphia, State of Pennsylvania, have invented a new and useful Improvement in Vegetable or Fruit Slicers, of which the following is a specification.

Our invention consists of a vegetable or fruit slicer embodying an impaling-pin, the same being screw-threaded, a sleeve which is fitted on said pin, interiorly screw-threaded, so as to engage with the threads of said pin, and exteriorly smooth, so as to readily penetrate the vegetable or fruit, and a knife projecting laterally from and secured to said sleeve, whereby by the rotation of said knife said sleeve positively travels on said pin and automatically travels into the vegetable or fruit without being pushed, and so advances the knife in spiral direction, thus causing the knife to cut the vegetable or fruit in spiral form, producing uniform slices which when severed at an angle to the direction of slicing separates the slices.

It further consists in adjustably mounting said pin upon a suitable handle, whereby the former may be adapted for vegetables or fruit of different lengths.

It also consists of a clamp on said handle for firmly holding the vegetable or fruit during the slicing operation.

Figure 1 represents a side elevation of a slicer embodying our invention. Fig. 2 represents a central longitudinal section thereof. Fig. 3 represents a front end view thereof.

Similar letters of reference indicate corresponding parts in the figures.

Referring to the drawings, A designates a screw-threaded rod or pin on which an article of vegetable or fruit is impaled, and B designates the handle which carries said pin. Fitted on said pin is the sleeve C, which is interiorly screw-threaded, so as to engage with the threads of the pin A. Radiating from and connected with said sleeve is the knife D, which is provided with a suitable handle E, in the present case integral therewith. On the forward end of the handle B are prongs F, which are adapted to pierce or penetrate the end of the article of vegetable or fruit while being sliced and temporarily holding the same on said pin and handle and preventing rotation thereof.

G designates clamps consisting of pointed or serrated heads H and the resilient arms J, which latter are connected, as at K, with the end of the handle, said arms extending in the longitudinal direction of the latter and normally being in flaring condition, whereby when the clamps are grasped they are pressed toward each other, and the heads H penetrate the side of the adjacent end of the article of vegetable or fruit and firmly hold the same, especially during slicing operations, it being evident that when the handle is rotated the sleeve travels or traverses the pin A by a positive action and advances the knife in spiral direction, whereby the knife is caused to enter the article of vegetable or fruit and cut the same spirally in slices of uniform thickness. The vegetable or fruit preserves its spiral form, while its coils remain supported on the impaling-pin until the knife can proceed no farther, when the clamps G are let go and the spirally-coiled article is released. After the work is thus accomplished the slices may be cut between center and circumference, thus separating the slices, or the article may be entirely removed from the pin A on which it was primarily impaled and retained in spiral direction, if so desired.

In order to adapt the pin to articles of varying sizes, the portion L of said pin is passed freely through the handle, and the latter is provided with a set-screw M, which passes through the handle and is adapted to tighten against the adjacent portion of the pin, it being evident that the pin may be inserted more or less in said handle, so as to adjust the length of the impaling portion proper outside of said handle, or the pin may be entirely removed and substituted by another of greater or less length and of different pitches of screw-threads, so as to vary the thickness of slices to be cut. It will also be seen that while the interior of the sleeve is screw-threaded, so as to engage with the threads of the impaling-pin and receive positive motion when rotated to correspondingly enter or penetrate the article to be cut or sliced, the exterior of said sleeve is smooth, so as to present no material obstruction to such entrance or penetration.

Various changes may be made in the details of construction shown without departing from the general spirit of our invention, and we do not, therefore, desire to be limited in each case to the same.

Having thus described our invention, what we claim as new, and desire to secure by Letters Patent, is—

1. In a slicer of the character stated, an impaling-pin, a spirally-rotatable knife thereon, a handle having a longitudinally-extending bore therethrough and a set-screw on said handle, said pin being adjustably fitted in said handle and adapted to be engaged by said screw.

2. In a slicer of the character stated, an impaling-pin, a rotatable knife thereon, a handle for said pin, a resilient arm secured to said handle, a tooth on the forward end of said arm adapted to pierce the side of the article to be sliced and a tooth on the forward end of said handle adapted to pierce the end of said article.

3. In a slicer of the character stated, an impaling-pin, a spirally-rotatable knife thereon, a handle carrying said pin, a resilient arm on said handle, and a tooth on the forward end of said arm, said arm being adapted to move toward said handle and have said tooth engage the article to be sliced.

WALDEMAR WALTER.
FRANK WALTER.

Witnesses:
ELEANOR WALTER,
LOUISA W. WALTER.